May 25, 1965     P. N. SORENSEN ETAL     3,185,808
INDUCTOR FOR HARDENING GEAR TEETH
Filed March 22, 1962
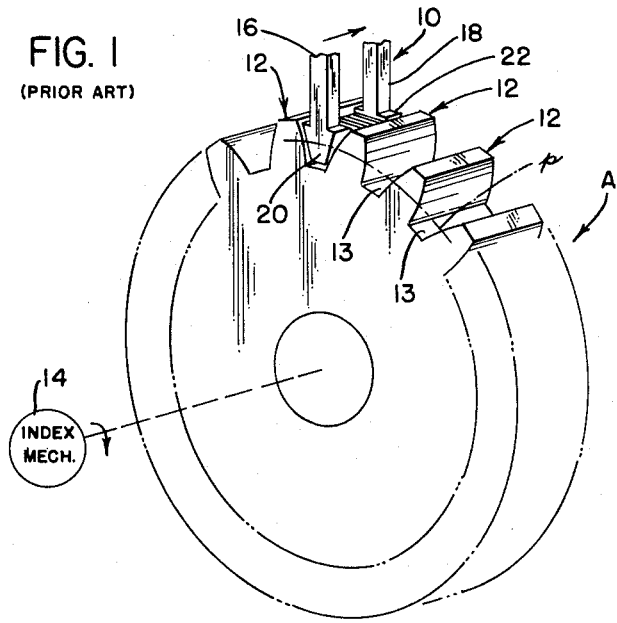
FIG. 1 (PRIOR ART)
FIG. 2 (PRIOR ART)
FIG. 3 (PRIOR ART)
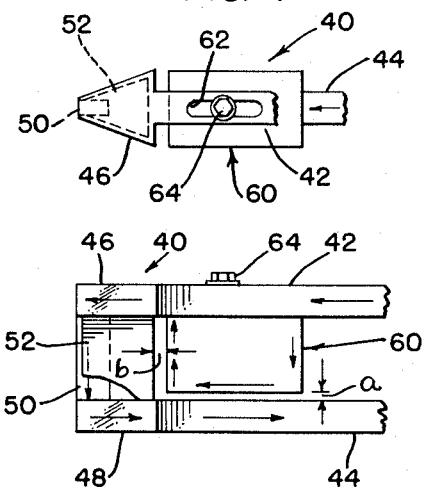
FIG. 4
FIG. 5
FIG. 6
INVENTORS
PHILLIPS N. SORENSEN &
RALPH P. ALBERTS
BY
ATTORNEY

United States Patent Office 3,185,808
Patented May 25, 1965

3,185,808
INDUCTOR FOR HARDENING GEAR TEETH
Phillips N. Sorensen, Bedford, and Ralph P. Alberts, Garfield Heights, Ohio, assignors to The Ohio Crankshaft Company, Cleveland, Ohio, a corporation of Ohio
Filed Mar. 22, 1962, Ser. No. 181,736
8 Claims. (Cl. 219—10.43)

The present invention pertains to the art of induction heating and more particularly to an inductor for progressively heating the working surfaces of gear teeth.

This invention is particularly applicable to progressive induction hardening of the opposed working surfaces of adjacent gear teeth and it will be described with particular reference thereto; however, it is to be appreciated that the invention has much broader applications and could be used for progressively heating the opposed surfaces of various close spaced upstanding members.

The present invention is directed to an improved inductor which is adapted for progressively hardening the opposed working surfaces of adjacent gear teeth by progressively heating and immediately thereafter quenching these surfaces. It is known in the induction hardening field to harden the working surfaces of adjacent gear teeth by providing a U-shaped inductor comprised of an electrical conductor having a longitudinally extending base and two parallel spaced legs. The U-shaped inductor is energized by a suitable power source and with the base parallel to the axis is then moved upwardly between adjacent gear teeth. Where the inductor passes through the space between the adjacent gear teeth, the surfaces of these teeth are progressively heated; and by providing a quenching outlet adjacent the trailing end of the inductor, the heated working surfaces of the gear teeth are immediately thereafter quench hardened.

Such a U-shaped inductor presented the problem that, if the inductor moved upwardly at a speed sufficiently slow to obtain the proper heating of the roots and bases of the gear teeth, then the relatively thin tip of the gear tooth was heated to an amount such that the heat was conducted through the tip of the gear tooth to the opposite side where it effected an annealing action on the opposite side of the gear tooth if such side had been previously hardened.

These and other disadvantages are eliminated by use of an inductor constructed in accordance with the present invention wherein an efficient and inexpensive modification of the prior U-shaped inductor changes the heating pattern of the inductor so that the thin addendum of the gear teeth are heated to a lesser extent than was possible in the prior inductor without a corresponding decrease in the heating effect adjacent the dedendum of the gear teeth.

In accordance with the present invention there is provided on an inductor for progressively heating the opposed working surfaces of adjacent gear teeth comprised of a generally U-shaped, longitudinally movable electrical conductor adapted to extend into the space between the teeth and having a base adapted to be parallel to and close to the root of the teeth and spaced legs extending radially outwardly close to the sides of the teeth, a low electrical resistance means adjacent the outermost portions of the teeth and between the legs of the conductor for limiting the heating effect at the outermost portions of the teeth.

The term "progressively heating" as used herein refers to the method of induction heating whereby an inductor causing an induced current pattern of limited area in a closely spaced workpiece is moved longitudinally along a surface of the workpiece so that the amount of heating is determined by the longitudinal width of the current pattern and the rate of longitudinal movement of the inductor.

The primary object of the present invention is the provision of an inductor for progressively heating the inwardly facing working surfaces of adjacent gear teeth before the teeth are quench hardened, which inductor is economical to manufacture, durable in operation and produces a heating pattern in the teeth which does not heat completely through the outermost portions of the teeth while providing sufficient heating of the innermost portions of the teeth.

Another object of the present invention is the provision of an inductor for progressively heating the opposed working surfaces of adjacent gear teeth before the teeth are quench hardened, which inductor is provided with the means for limiting the heating effect of the inductor near the outermost portions of the teeth as the inductor is move longitudinally between the teeth.

Still a further object of the present invention is the provision of an inductor for progressively heating the inwardly facing working surfaces of adjacent gear teeth before the teeth are quench hardened, which inductor is generally U-shaped and has a low electrical resistance member between the legs thereof for limiting the heating effect of the inductor as it passes longitudinally between the teeth.

Yet another object of the present invention is the provision of an improvement over the conventional U-shaped inductor adapted to move vertically upward between adjacent gear teeth to progressively heat the oppositely facing working surfaces of the teeth prior to quench hardening, which improvement comprises the provision of a low electrical resistance member mounted on one leg of the inductor near the outermost portion of the gear teeth and extending longitudinally toward the other leg.

Another object of the present invention is the provision of an inductor for progressively heating the inwardly facing working surfaces of adjacent teeth of a gear before quench hardening of the surfaces by passing the inductor in succession through the peripheral spaces between adjacent teeth, which inductor controls the heating pattern in the gear teeth so that the heating of the working surfaces on one side of the teeth does not temper or anneal a previously hardened working surface on the opposite side of the same teeth.

These and other objects and advantages will become apparent from the following description used to illustrate the preferred embodiment of the invention as read in connection with the accompanying drawing in which:

FIGURE 1 is a pictorial and somewhat schematic view of an installation for progressively hardening the inwardly facing surfaces of adjacent gear teeth;

FIGURE 2 is a pictorial view illustrating the prior art inductor;

FIGURE 3 is an enlarged, partial pictorial view illustrating the current path and heating pattern obtained in the adjacent gear teeth by the inductor shown in FIGURE 2;

FIGURE 4 is a top view illustrating a preferred embodiment of the present invention;

FIGURE 5 is a side view of the preferred embodiment disclosed in FIGURE 4; and

FIGURE 6 is an enlarged, partial pictorial view illustrating the current path and heating pattern obtained in the adjacent gear teeth by use of the inductor shown in FIGURES 4 and 5.

Referring now to the drawings, wherein the showings are for the purposes of illustrating a preferred embodiment of the invention only and not for the purposes of limiting same, FIGURE 1 shows, somewhat schematically, an installation for progressively heating the oppositely facing working surfaces of adjacent gear teeth on spur gear A by passing a generally U-shaped inductor 10 longitudinally and upwardly through the space between adjacent teeth 12, which spaces have a root portion 13 between the teeth and are spaced evenly around the outer periphery of gear. The upwardly direction followed by inductor 10 is indicated by the arrow in FIGURE 1. As the inductor passes longitudinally through the space between any two adjacent teeth 12, the inwardly facing working surfaces of the teeth are progressively heated by currents induced into the working surfaces in a manner commonly known in the induction heating art. Immediately after the inwardly facing working surfaces contiguous with the inductor 10 are heated, the surfaces are quench hardened by propelling a quenching medium or air blast onto the heater surfaces. In practice, as the inductor is moved vertically upward, the trailing end of the inductor can be provided with a quenching tube that propels a quenching medium onto the previously heated surfaces. Since the inductor is moving upwardly, the quenching medium flows over the heated surfaces without interfering with the induction heating operation. After the inwardly facing working surfaces of the adjacent teeth 12 are quench hardened, the inductor 10 is moved downwardly and an appropriate indexing mechanism 14, shown only schematically, indexes the gear A to align the inductor with the space between another pair of teeth 12 and the heating and quenching operation is repeated. This procedure is continued until the working surfaces of all teeth 12 on the outer periphery of gear A are quench hardened.

The quench hardening installation as disclosed in FIGURE 1 is commonly used for induction hardening gear teeth and a U-shaped inductor, such as inductor 10, is usually provided for heating the teeth. Such an inductor comprises generally parallel legs 16, 18 formed from an electrically conductive material, such as copper, and adapted to be connected to an appropriate source of alternating current; wedge-shaped electrically conductive portions 20, 22 forming the terminal ends of legs 16, 18 respectively; a longitudinally extending, electrically conductive base 24 electrically connecting ends 20 and 22; and a group or stack of wedge-shaped iron lamina 26 having an outer surface generally matching the peripheral surface of the wedge-shaped end 20, 22.

Referring to FIGURE 3, the gear A has a pitch line $p$ and a current pattern $x$ defined by the path of the current induced by the inductor 10, which current pattern is produced by the current induced into the workpiece and determines the $I^2R$ heating of the workpiece. This current pattern is characterized by a longitudinally conducted heating current in the root portion 13 between teeth 12 which heating current divides and extends outwardly through the sides of the teeth. The current path is completed by the conduction of the heating current across the outermost portions of the teeth 12. As this induced current path forming pattern $x$ is moved longitudinally along the working surfaces of the adjacent teeth 12, by upward movement of the inductor 10, substantially the same amount of heating takes place in the innermost portion of the individual teeth 12 below pitch line $p$ as takes place in the outermost portion above the pitch line $p$. Through this heating effect, a heating pattern $y$, shown in FIGURE 3, is provided in the cross section of gear A beween the teeth 12. Referring to FIGURE 3, this heating pattern $y$ overlaps the previously hardened pattern $y'$ in the opposite working surface of teeth 12 so that this hardened working surface is tempered or annealed to decrease its hardness. The annealing of the opposite working surface is caused by conduction of the heat through the relatively thin portions of the teeth 12, especially at the portions above the pitch line $p$. Since the quenching fluid is directed onto the heated working surfaces immediately following the heating operation, the heat generated in the more thick portions of the teeth 12, especially below pitch line $p$, does not have sufficient time to be conducted through the teeth to the opposite hardened working surface before the heat is dissipated by the quench fluid. Thus, the problem created by the use of the U-shaped inductor 10 illustrated in FIGURES 1 and 2 is the tempering or annealing of the previously hardened working surface adjacent the outermost portions of teeth 12. The present invention is directed to an improvement of the prior U-shaped inductor 10 to eliminate the disadvantages created by the progressive heating and quenching of the inwardly facing working surface by passing the inductor 10 upwardly between adjacent teeth 12.

In FIGURES 4 and 5 there is shown an improved U-shaped inductor 40 adapted for use in a heating installation such as shown in FIGURE 1. The inductor provides a current path in the inwardly facing working surfaces of adjacent gear teeth 12 that prevents a heating pattern which will temper or anneal the previously hardened working surfaces on the opposite sides of teeth 12. The improved inductor 40 comprises generally parallel legs 42, 44 formed of an electrically conductive material such as copper and connected to an appropriate source of alternating current; wedge-shaped electrically conductive ends 46, 48 of legs 42, 44 respectively; a longitudinally extending, electrically conductive base 50 joining the wedge-shaped ends 46, 48; and a group or stack of wedge-shaped iron lamina 52 having an outer shape generally corresponding to the outer periphery of wedge-shaped ends 46, 48. As so far described, the inductor 40 is essentially identical to the U-shaped inductor 10 disclosed in FIG. 2; however, the inductor 40 is provided with a low electrical resistance member, such as block 60 connected onto leg 42 by an appropriate adjustable means such as an elongated slot 62 and a bolt 64 threadably received in the block 60 to adjust the position of the block with respect to the upper edges of lamina 52. In the preferred embodiment, the low electrical resistance member is simply a copper block 60 spaced from leg 44 a distance $a$ and from the upper edges of lamina 52 a distance $b$. The distance $a$ may be changed by various means, one of which could comprise placing shims between block 60 and arm 42 and another of which could comprise providing a means for changing the outer dimensions of block 60. The spacing $b$ of the block 60 with respect to the upper edges of lamina 52, of course, can be changed by moving the bolt 64 in the elongated slot 62. Although the preferred embodiment discloses the low electrical resistance block 60 as adjustably mounted on arm 42, it is within the contemplation of the invention to connect the block 60 onto either arms 42, 44; and, in some cases, the block 60 may even be fixedly secured onto the arm. It is further appreciated that the operation of the improved inductor 40 may be accomplished by spacing the low resistance block 60 between the parallel arms 42, 44 without actually electrically connecting it to either arm.

In operation of the improved inductor 40, current flows through the generally U-shaped inductor defined by legs 42, 44 and longitudinally extending arm 50 in a manner quite similar to the current flow through inductor 10; however, by proximity effect, current flowing in leg 42 tends to flow toward leg 44, and accordingly, around the periphery of block 60. By the accepted theory of operation, the laminations 52 cause the current flowing along the lower edge of block 60 to deflect transversely toward the opposed faces of the block 60. This, in essence, forces the current flow toward the surface of teeth 12, and thus, distributes the induced voltage evenly in these surfaces adjacent the lower edge of the insert. Because of this distribution of the induced voltage, the current flow is distributed to reduce the $I^2R$ heating adjacent the addendum, or outermost portion, of the teeth 12. Current flow in end 46 is similarly distributed to prevent substantial heating in the surfaces of the teeth opposite this end. As the current approaches arm 50, the laminations and proximity effect concentrate the current in the base of the teeth to provide a higher $I^2R$ heating effect. The resulting heating pattern $m$ is shown in FIGURE 6 and the current pattern $n$ that causes this heating pattern is comprised basically of root path $o$, rear side paths $q$, upper paths $t$, and front side paths $u$. The current in paths $q$ and $t$ is so distributed that the heating effect is not sufficient to appreciably temper the portions of the teeth contiguous thereto; however, the concentration or focusing of current in paths $o$ and $u$ will substantially raise the temperature of the teeth areas adjacent these paths and causes the heating pattern $m$.

The width of the heating pattern opposite path $u$ can be controlled by changing the distance $a$ between the low resistance block 60 and parallel leg 44, and it is appreciated that if the spacing $a$ were adjacent the leg 42, the width of the pattern would be at the opposite end of the current path $n$. This reversal of the heating pattern would be feasible; however, in practice it is preferred to have the upstanding leg of the heating pattern adjacent the trailing end of the upwardly moving U-shaped inductor 40 so that the teeth can be quenched immediately after they are heated. The distance $b$ may be varied, as has been explained, to change the heating effect near and above the pitch line $p$ and thus, obtain the proper heating of the entire working surface of teeth 12.

By using an inductor constructed in accordance with the present invention, the heating pattern $r$ in the gear A, as is shown in FIGURE 6, does not extend into the previously hardened area $r'$ on the inwardly facing working surface adjacent an opposite side of tooth 12; therefore, the tendency to temper or anneal this hardened surface adjacent area $r'$ by heat conducted through the relatively thin portions of tooth 12 is substantially eliminated.

The present invention has been described by reference to a preferred embodiment and it is to be appreciated that the scope of the invention is much broader and various structural changes may be made without departing from the spirit and scope of the invention. It may be possible to contour one parallel leg of the inductor to provide the counteracting flux field without substantial departure from the intended scope of the invention.

Having thus described our invention, we claim:

1. In an inductor for progressively heating the oppositely facing working surfaces of adjacent gear teeth by moving said inductor longitudinally between said teeth, said inductor comprising a generally U-shaped, electrical conductor adapted to extend between said teeth and having spaced legs terminating in a lower longitudinally extending portion closely spaced from the root of said teeth during use, the improvement comprising: a low electrical resistance member adjacent the outermost portion of said teeth during use and between said legs for controlling the shape of the heating pattern in said working surfaces to limit the heating at the outermost portions of said teeth, said low resistance member having an electrical resistivity on the order of copper.

2. The improvement as defined in claim 1 wherein said low electrical resistance member is spaced from one of said legs a first distance and is spaced from the other of said legs a second distance.

3. The improvement as defined in claim 2 wherein said first distance is equal to said second distance.

4. The improvement as defined in claim 2 wherein said first distance is greater than said second distance.

5. The improvement as defined in claim 1 including a means for adjusting the spacing of said low electrical resistance member from said lower longitudinally extending portion of said inductor.

6. An inductor adapted for progressively heating the oppositely facing working surfaces of adjacent gear teeth by moving said inductor longitudinally between said teeth comprising, in combination a generally U-shaped, electrical conductor adapted to extend between said teeth and having spaced legs terminating in a lower longitudinally extending portion closely spaced from the root of said teeth, and a low electrical resistance member adjacent the outermost portion of said teeth and between said legs for controlling the shape of the heating pattern in said working surfaces to limit the heating at the outermost portion of said teeth, said low electrical resistance member being mounted on one of said legs and spaced from the other of said legs.

7. An inductor adapted for progressively heating the oppositely facing working surfaces of adjacent gear teeth by moving said inductor longitudinally between said teeth before said teeth are quench hardened, comprising in combination a generally U-shaped electrical conductor adapted to extend between said teeth and having spaced, generally parallel, legs terminating in a lower longitudinally extending base closely spaced from the root of said teeth and a low electrical resistance member between said legs for controlling the shape of the heating pattern in said working surfaces to limit the heating at the outermost portion of said teeth, said member being mounted on one of said legs adjacent the upper portion of said teeth and spaced from the other side of said legs.

8. An inductor adapted for progressively heating the oppositely facing working surfaces of adjacent gear teeth before said teeth are hardened, comprising in combination: a generally U-shaped electrical conductor having a longitudinal arm and spaced legs adapted to be connected to a source of alternating current and to be moved between said teeth, the improvement comprising: a low electrical resistance block secured between said legs and closely spaced from said arm to control the heating pattern in said working surfaces near the outermost portion of the teeth said block having an electrical resistivity on the order of copper.

References Cited by the Examiner
UNITED STATES PATENTS

| 2,647,200 | 7/53 | Redmond | 219—10.79 X |
| 2,709,741 | 5/55 | Albrecht | 219—10.79 |
| 2,790,883 | 4/57 | Williamson | 219—10.79 |
| 2,810,054 | 10/57 | Jones | 219—10.79 |
| 3,109,909 | 11/63 | McBrien | 219—10.43 |

FOREIGN PATENTS 904,804  1/54  Germany.

RICHARD M. WOOD, *Primary Examiner.*